United States Patent [19]

Savage et al.

[11] Patent Number: 4,719,861

[45] Date of Patent: Jan. 19, 1988

[54] ENERGY MANAGEMENT METHOD FOR A LOCOMOTIVE INCLUDING SINGLE-SIDED LINEAR INDUCTION MOTORS

[75] Inventors: Jack W. Savage, Centerville, Ohio; Thomas J. Savage, Darien, Ill.; Mark A. Navarre, Huntington Woods, Mich.

[73] Assignee: General Motors Corporation, Detroit, Mich.

[21] Appl. No.: 922,249

[22] Filed: Oct. 23, 1986

[51] Int. Cl.$^4$ .................. B61C 7/04; B61C 15/04; B61C 15/10

[52] U.S. Cl. .................. 104/165; 105/34.2; 105/77; 318/52; 291/2

[58] Field of Search .................. 105/34.2, 49, 73, 76, 105/77; 104/165, 290; 318/52; 180/197; 291/1, 2

[56] References Cited

U.S. PATENT DOCUMENTS

| | | | |
|---|---|---|---|
| 3,437,896 | 4/1969 | Hoge | 318/52 |
| 3,577,929 | 5/1971 | Onoda et al. | 104/290 |
| 3,877,387 | 4/1975 | Kasai et al. | 105/73 X |
| 3,997,822 | 12/1976 | Logston, Jr. et al. | 318/52 |
| 4,236,595 | 12/1980 | Beck et al. | 180/197 X |
| 4,440,092 | 4/1984 | Sobolewski | 105/49 X |

Primary Examiner—Robert B. Reeves
Assistant Examiner—Scott H. Werny
Attorney, Agent, or Firm—Mark A. Navarre

[57] ABSTRACT

Single-sided linear induction motors (SLIMs) suspended in proximity to the rail of a locomotive are energized to increase the effective adhesion between the locomotive drive wheels and the rail in response to the detection of an operating condition in which the tractive effort of the locomotive traction motors is limited by less than optimal adhesion. The SLIMs are energized in relation to the reserve power capability of the power source and the limit of tractive effort improvement. One method further employs sand dispensing units activated if the suboptimal operating condition is not alleviated by activation of the SLIMs. Another method uses the sand dispensing units first, and only activates the SLIMs if the suboptimal operating condition is not alleviated by activation of the sand dispensing mechanism.

13 Claims, 5 Drawing Figures

PHASE B (0) SYNCHRONOUS SPEED=2λf

ENERGY MANAGEMENT METHOD FOR A LOCOMOTIVE INCLUDING SINGLE-SIDED LINEAR INDUCTION MOTORS

This invention relates to an energy management system for a locomotive, and more particularly to a system for controllably increasing the tractive effort of the locomotive when the adhesion between its drive wheels and the rail limit the tractive effort of the traction motors.

The railroad industry is always interested in higher locomotive tonnage ratings as a means of reducing operating expenses. Essentially, higher tonnage ratings mean that a given load may be pulled with fewer locomotives, or that more load can be pulled with a given number of locomotives. In recent years, tonnage rating increases have been achieved through increases in the locomotive traction horsepower (THP) capability, and the usage of wheel slip or creep control systems such as the Super-Series System, offered on locomotives made by Electro-Motive Division of General Motors Corporation.

In spite of increased horsepower capability and wheel slip control, the tonnage rating improvements have been limited by adverse rail conditions, especially in mountainous regions. For example, it has been shown that curves in the track and the presence of water or oil on the rail substantially reduce the adhesion between the rail and the drive wheels of the locomotive. For this reason, sand is often applied to the rails when excessive slippage is encountered. The slip control systems reduce the engine throttle (rack) setting to the extent that the sand fails to sufficiently improve the rail conditions.

To increase locomotive tractive effort, and to improve rail adhesion, it has been suggested to suspend a linear induction element from the trucks of a locomotive in close proximity to the rail. See, for example, the Zehden U.S. Pat. No. 782,312 and dos Santos U.S. Pat. No. 4,236,455. The element supported by the locomotive is energized with electrical current from an engine-driven generator, and operates as a primary for generating a traveling electromagnetic field. The solid steel rail acts as a secondary reaction element for the primary. Together, the primary and secondary elements comprise a single-sided linear induction motor, or SLIM. The SLIM arrangement can increase the tractive effort (or braking effort) in two ways: it can increase the adhesion between the driving wheels and the rails, and it can provide linear propulsion independent of the traction motors.

This invention is directed to an energy management system for an engine-powered electric locomotive which includes SLIMs. The preferred and most efficient means of converting the energy of the engine to tractive effort is through the conventional engine-driven generator and traction motor, and the energy management system of this invention energizes the SLIMs to permit increased utilization of the generator and traction motors when adverse rail conditions prevent the locomotive from achieving its maximum net tractive effort NTE(MAX). In such event, the engine has reserve power capacity, and a portion of such power capacity is used to energize the SLIMs.

The amount of power directed to the SLIMs is chosen in relation to the reserve power HP(RES) and the combined additional power requirement dNHP(FULL) of the SLIMs and traction motors, taking into account the improved adhesion provided by the energization of the SLIMs. If the reserve engine power is great enough, the energization of the SLIMs can enable the locomotive to closely approach its maximum tractive effort. In any event, the object is to use substantially all of the available engine power output, at least to the extent that the increased power usage increases the tractive effort of the traction motors.

The energy management system of this invention works independently of any wheel slip control system of the locomotive. This is true whether the slip control is of the slip elimination type or the controlled creep type. In either event, the presence of adverse rail conditions can result in an overcapacity of locomotive traction system power. In such event, the energy management system of this invention can operate to direct a portion of the available power to the SLIMs, thereby increasing the tractive effort of the traction motors through increased adhesion, and providing an additive linear propulsion force as well.

In some instances, the SLIMs are energized even though the rail conditions may be optimum. In starting, for example, there is often a relatively large surplus of engine power even with optimum rail adhesion, and the SLIMs are energized for their linear propulsion force, regardless of the rail condition. In other instances, such as in climbing a grade, the operator may wish to utilize the maximum available engine power. To this end, the energy management system of this invention may include a "maximum effort" mode whereby the operator may enlist the linear propulsion force of the SLIMs, even though the rail conditions are optimum. The "maximum effort" mode may also be used to advantage in the event the traction motor excitation is reduced due to overheating. This results in a surplus of engine power which can be diverted to the SLIMs to obtain the linear propulsion force, unless the generator becomes overheated as well.

The energy management system of this invention also encompasses a sanding control which cooperates with the SLIMs to maximize the tractive effort. In some situations, the surplus engine power may be limited so that the SLIMs cannot be fully energized to maximize the tractive effort. In other situations, the rail conditions may be so poor that full energization of the SLIMs will not provide enough extra adhesion to maximize the tractive effort. In one embodiment, sanding is used to complement the SLIMs; in another embodiment, the SLIMs are used to complement sanding.

Other benefits of the energy management system of this invention include increased lateral stability during SLIM excitation, and improved braking effort.

IN THE DRAWINGS

Figure 1:
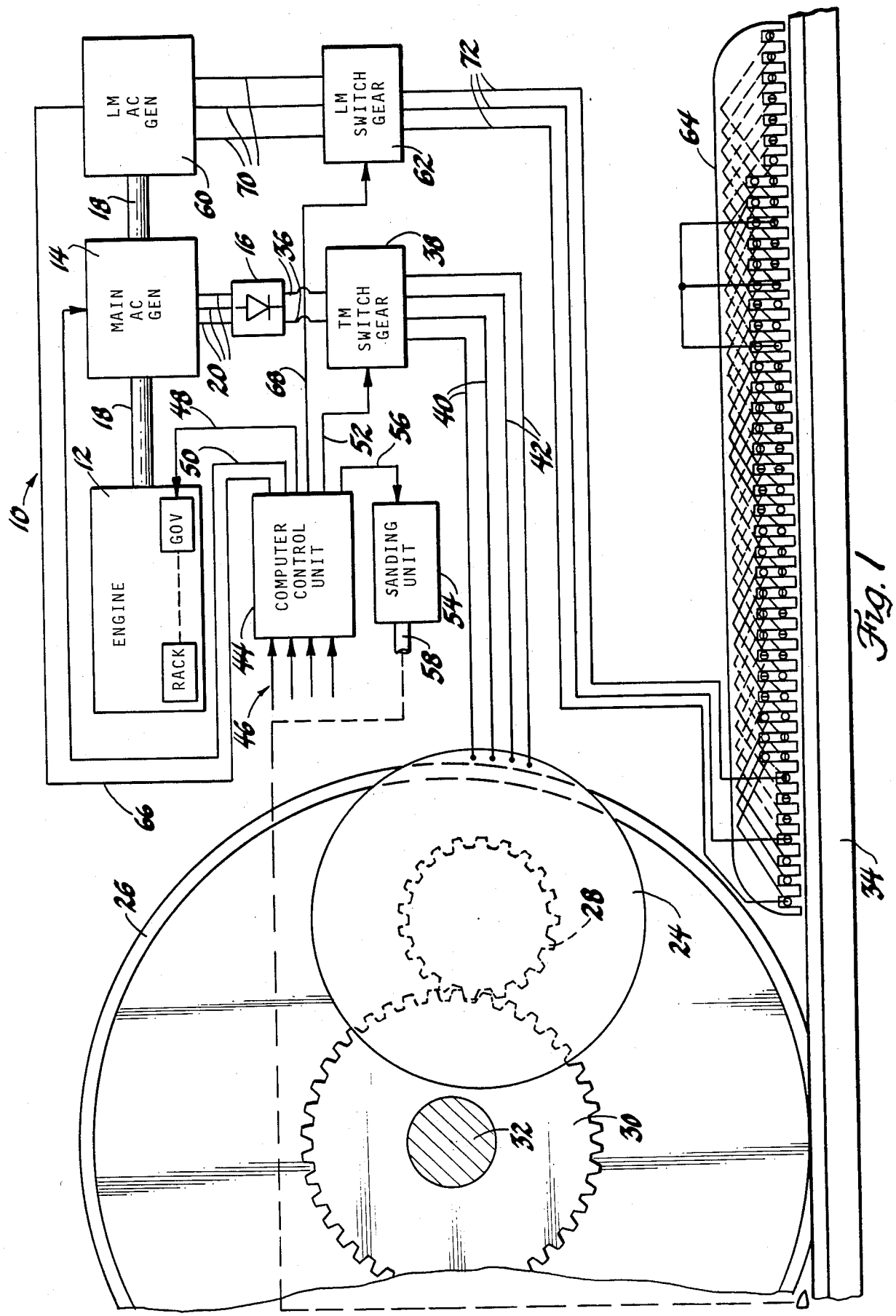
FIG. 1 is a schematic diagram of a locomotive traction system and the energy management system of this invention, including a computer-based control unit.

Referring now to the drawings, and more particularly to FIG. 1, the reference numeral 10 generally designates a diesel-electric locomotive power plant including a diesel engine 12, a main AC generator 14, and a bridge rectifier unit 16. The engine 12 drives the generator 14 via output shaft 18, and the three-phase AC output of generator 14 on conductors 20 is converted to DC by the bridge rectifier unit 16.

Figure 2:
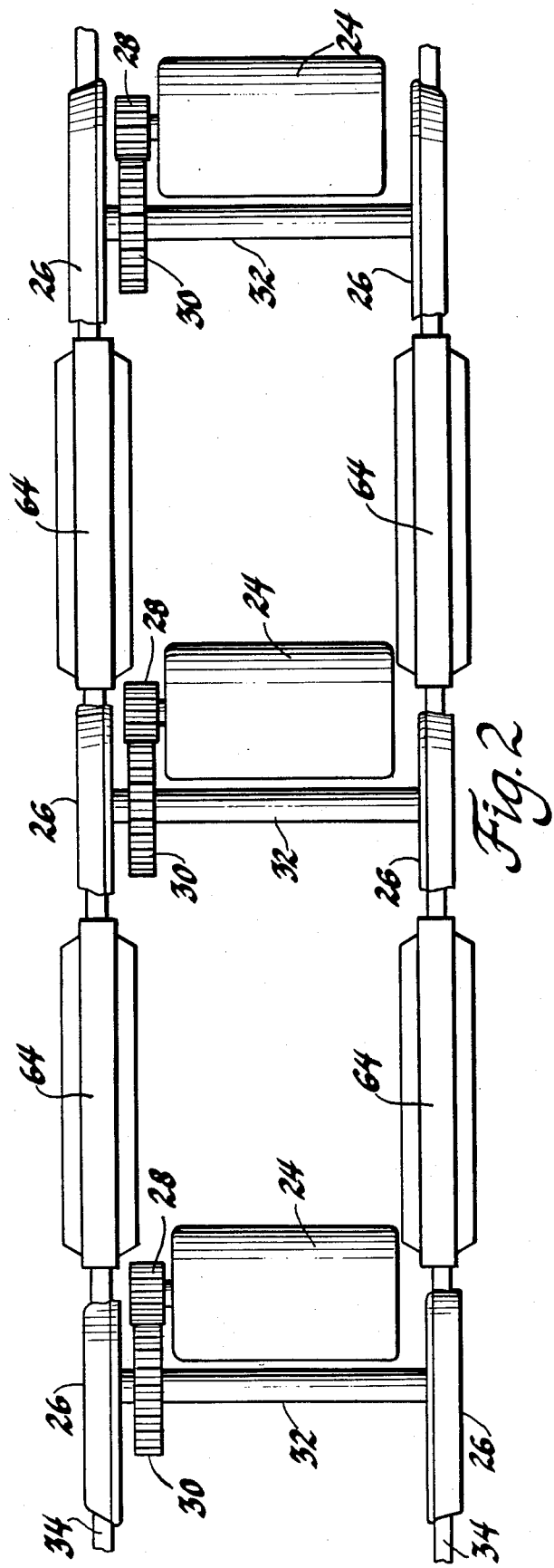
FIGS. 2-3 depict the SLIMs on a locomotive truck and their location relative to the rails.

Locomotives typically include a number of series type DC traction motors 24, each of which is connected to rotatably drive a pair of locomotive wheels 26. FIG. 2 is an overhead view of a three-axle drive arrangement including three pairs of locomotive wheels 26 and three traction motors 24. In each case, the traction motor drives a pinion gear 28, which is maintained in meshing engagement with a ring gear 30. Each ring gear is attached to an axle 32, which in turn, is drivingly connected to a pair of wheels 26. The wheels 26, of course, ride on a pair of steel rails 34 supported on a railway bed.

The locomotive traction motors 24 are energized with the DC output of bridge rectifier 16 on conductors 36 through an electrically operated switching arrangement (TM SWITCHING GEAR) designated by the block 38. The TM SWITCHING GEAR 38 connects the traction motors 24 in various series and parallel combinations in a conventional manner, depending on the locomotive speed; it may be external as shown, or integral with the main generator 14. One such traction motor 24 and locomotive wheel 26 are depicted in FIG. 1. The motor armature winding is supplied with DC current via the conductor pair 40, and the field winding is supplied with DC current via the conductor pair 42.

A computer-based control unit 44 receives a number of demand and status related inputs as designated by the lines 46. The control unit 44 is responsive to the inputs, and controls the engine governor setting and the excitation of the main generator field, as indicated by the lines 48 and 50. The governor setting is controlled in relation to the setting of a power controller manually operated by the locomotive engineer. The field winding excitation is also determined in relation to the power controller setting so that the generator 14 produces a corresponding output power level. The governor (GOV) is connected to the engine fuel injector rack (RACK), and maintains the engine speed in accordance with the selected setting regardless of the load imposed by generator 14. The control unit 44 also controls the operation of TM SWITCHING GEAR 38 for suitably connecting the traction motors 24, as indicated by the line 52.

The control unit 44 also operates a sanding unit 54 as indicated by the line 56. The sanding unit includes a vessel for holding sand and a dispensing mechanism for applying sand to the rails 34 via hose 58 to increase the adhesion between the rails 34 and the driving wheels 26.

The control unit 44 may also include a conventional wheel slip control system for controlling or substantially eliminating slippage of the wheels 26 on the rails 34. An example of a controlled slippage system is given in the de Buhr et al. U.S. Pat. No. 3,982,164, issued Sept. 21, 1976, such patent being assigned to the assignee of the present invention. Both the controlled slip and the slip elimination systems achieve their control objective by reducing the field excitation of the generator 14 from the normal value when excessive slippage is detected. Slippage, of course, can be detected in various ways, such as by comparing the wheel speed with an independent measure of the locomotive speed. Some slip control systems also use a sand dispensing mechanism such as the sanding unit 54, as indicated in the above-mentioned de Buhr patent.

The additional elements of FIG. 1 associated with the energy management system of this invention include an auxiliary three-phase AC generator 60, a linear motor switching arrangement (LM SWITCHING GEAR) 62, and a three-phase linear motor primary element 64. The engine output shaft 18 extends through the main generator 14 to drive the auxiliary generator 60, and the control unit 44 controls the excitation of the generator field winding, as indicated by the line 66. The control unit 44 also controls the operation of the LM SWITCHING GEAR 62, as indicated by the line 68, for enabling energization of the linear motor primary element 64 via conductors 70 and 72.

In the illustrated embodiment, the linear motor primary element 64 has four poles, and is wound with three-phase WYE-connected windings. The location and WYE-connection of the windings is schematically depicted in FIG. 1, where Phase A coils are represented by the open circles, Phase B coils are represented by the vertically divided circles, and Phase C coils are represented by the horizontally divided circles. There are nine (9) slots per pole, and the coil pitch is 7/9.

In a six-axle locomotive, the linear motor primary element 64 of FIG. 1 is but one of eight such elements, with four mounted on each truck as indicated in FIG. 2. Each is articulated from a pair of locomotive axles 32, centered over, and in relatively close proximity to the rail 34. As also indicated in FIG. 2, the core width of each primary element is approximately twice the rail head width. This tends to produce a centering force when the primary elements 64 are energized which reduces the tendency of the wheels 26 to "climb" the rails 34.

Together, the primary elements 64 and the rails 34 form a single-sided linear induction motor (SLIM), the clearance therebetween determining the magnetic air gap. In the illustrated embodiment, the air gap between the primary element tooth tips and the rail 34 is approximately 6.35 mm (0.25 in). Articulating the elements 64 from the axles 32 permits the gap to be maintained substantially constant, even when traveling over irregular or uneven rail sections.

Figure 3:
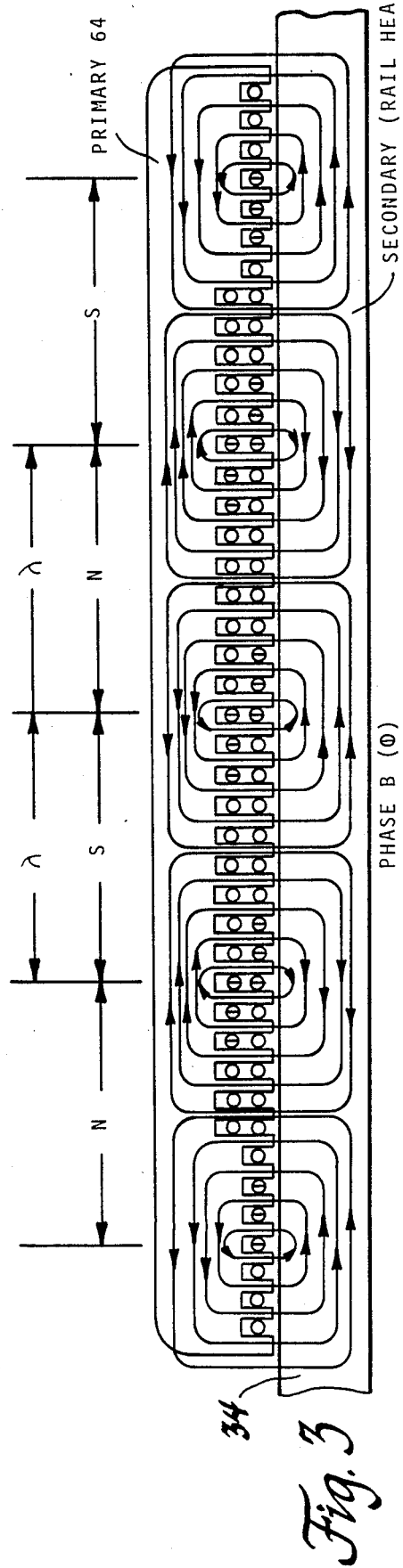

Energization of the primary element windings establishes a magnetic flux path in the core of the primary element, across the air gap, and through the head of rail 34. A representation of the magnetic flux produced by energization of the Phase B coils alone is depicted in FIG. 3.

In operation, the coils are energized with the three-phase output of auxiliary generator 60, thereby producing traveling magnetic fields along the length of the rail 34 under the primary elements 64. This produces both an attractive magnetic force which tends to increase the adhesion between the wheels 26 and the rail 34, and linear magnetic forces which tend to propel the locomotive in the direction of the traveling fields.

The attractive force generated by the SLIMs is proportional to the ratio $V_{LM}/f$, where $V_{LM}$ is the voltage applied to the SLIMs, and f is the frequency of the applied voltage. When the SLIMs are energized with an auxiliary generator 60, as shown in FIG. 1, the frequency f of the applied voltage varies in accordance with the speed of engine 12. In such case, the applied voltage must be scheduled in relation to the engine speed (power controller setting PC) so that the ratio $V_{LM}/f$ is maintained substantially constant for a given level of required attractive force. In practice, the applied voltage $V_{LM}$ is determined in relation to the product of a maximum voltage term $V_{LM}(MAX)$ and a pair of power reduction terms determined in relation to the engine surplus power available and the adhesion requirements of the locomotive. In this way, the ratio $V_{LM}/f$ can be maintained substantially constant by scheduling the maximum voltage $V_{LM}(MAX)$ in direct relation to the engine speed or the setting PC of the operator manipulated power controller.

Figure 4:
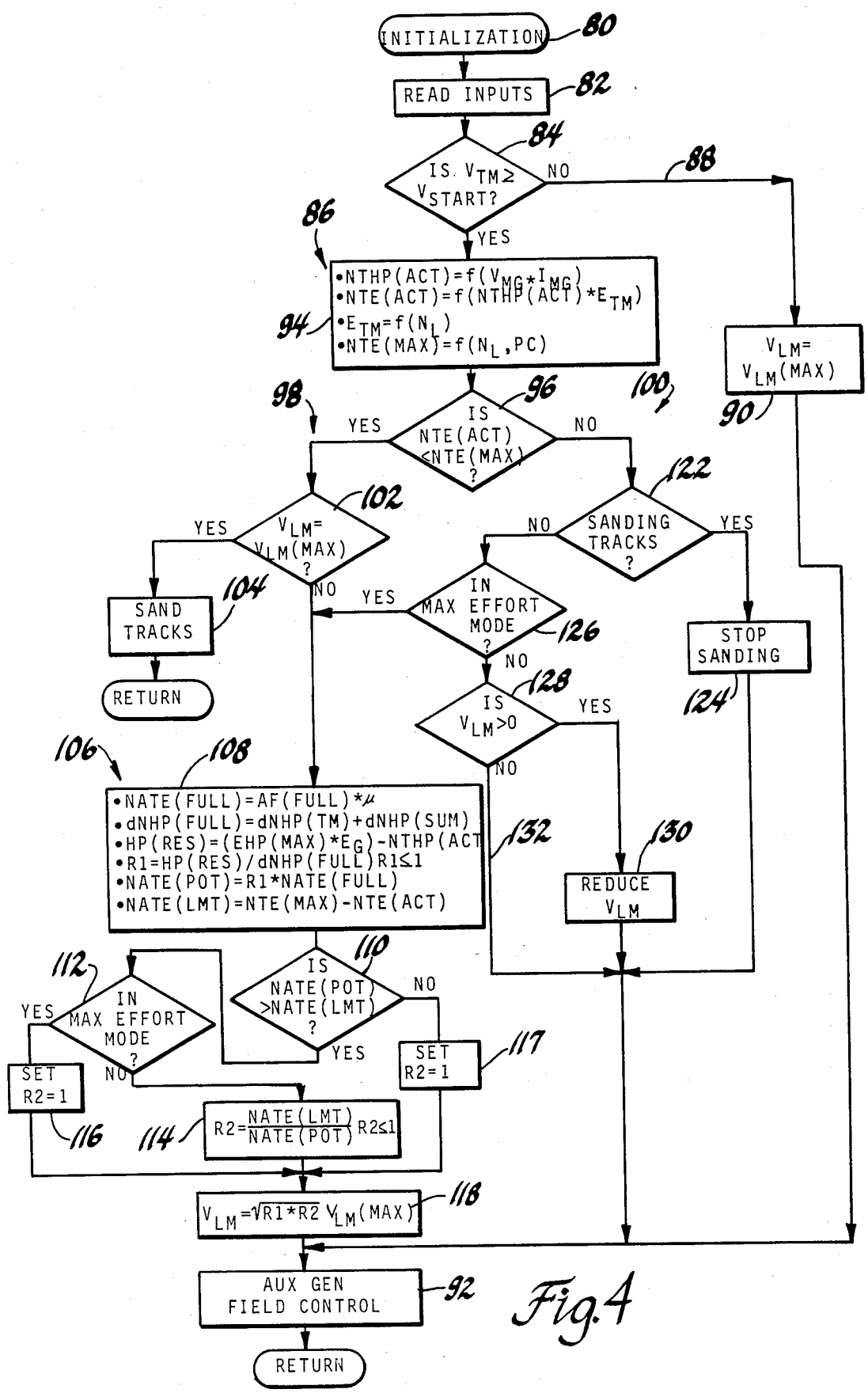
FIGS. 4-5 are flow diagrams representative of computer programs executed by the computer-based control unit of FIG. 1 in carrying out the control functions of this invention.
Figure 5:
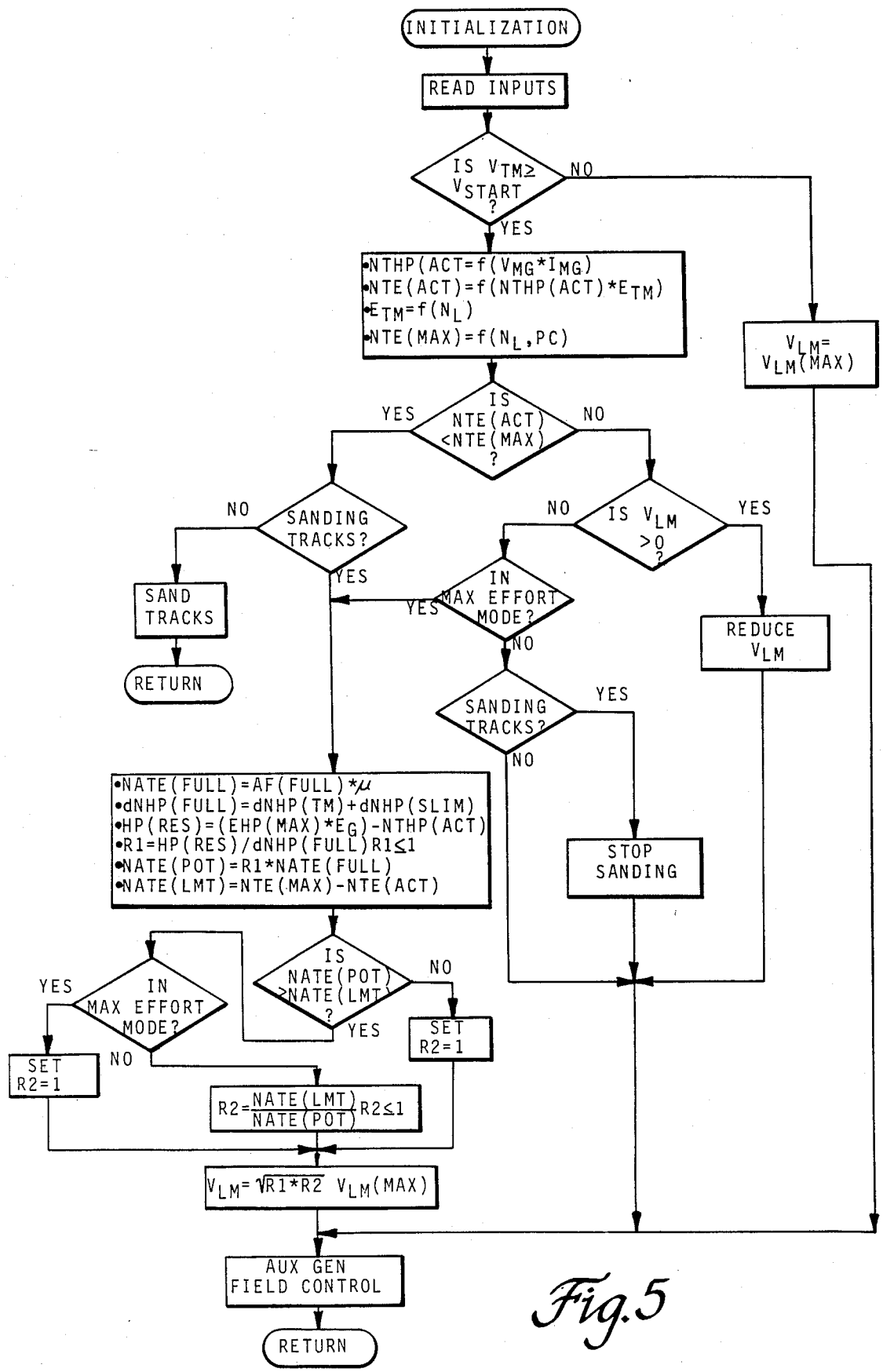

The flow diagrams of FIGS. 4 and 5 represent computer program instructions to be executed by the control unit 44 of FIG. 1 for carrying out the control functions of this invention. Flow diagrams of the other control functions performed by control unit 44 are not particularly relevant to this invention, and are not depicted herein. The flow diagram of FIG. 4 depicts a first embodiment wherein the linear motor is the primary adhesion control mechanism, and sanding is used as a supplementary control mechanism. FIG. 5 depicts a second embodiment wherein sanding is the primary control mechanism, and the linear motor is used as a supplementary control mechanism. In each embodiment, however, the object is essentially the same—to effectively manage the engine power output by diverting a controlled portion of the reserve engine power to the SLIMs to the extent that the adhesion between the wheels 26 and the rails 34 is usefully increased. In the broadest sense of the invention, sanding is not required.

Referring now to the flow diagram of FIG. 4, the reference numeral 80 generally designates a series of initialization instructions executed at the initiation of each period of locomotive operation, and upon each reset of the control unit 44. The initialization instructions serve, among other things, to initialize the input and output variables, and the various status registers of control unit 44.

Following execution of the initialization instructions, the instruction block 82 is executed to read various inputs required for the energy management system operation. Such inputs include the locomotive speed $N_L$, the setting PC of the power controller, the traction motor voltage $V_{TM}$, and the rectified output voltage $V_{MG}$ and current $I_{MG}$ of main generator 14. Other parameters such as the nominal weight W of the locomotive, the maximum engine power output EHP(MAX), and other known constants and fixed relationships are stored in the control unit 44.

Decision block 84 determines if the traction motor voltage $V_{TM}$ indicates that the locomotive is in a starting mode. In the illustrated embodiment, the voltage $V_{TM}$ is compared with a starting threshold, $V_{START}$. The value of $V_{START}$ is scheduled in relation to the setting PC of the operator manipulated power controller. By way of example, the value of $V_{START}$ for a relatively high power setting would be on the order of 50 volts. If the locomotive is not in the starting mode ($V_{TM}$ greater than or equal to $V_{START}$), the flow diagram portion designated generally by the reference numeral 86 is executed for determining how much, if any, engine power should be diverted to the SLIMs 64. If the locomotive is in the starting mode ($V_{TM}$ less than $V_{START}$), the flow diagram portion 86 is skipped as indicated by the flow line 88, and instruction block 90 and 92 are executed to set the SLIM voltage $V_{LM}$ at the maximum rated value $V_{LM}(MAX)$, and to energize the auxiliary generator field winding accordingly.

In the flow diagram portion 86, the instruction block 94 is executed to determine various operating parameters, including the net actual power usage of the traction motors NTHP(ACT), the net actual tractive effort of the traction motors NTE(ACT), and the net maximum tractive effort of the traction motors NTE(MAX). The net actual power usage of the traction motors NTHP(ACT) is determined as a function of the product of the rectified output voltage $V_{MG}$ and current $I_{MG}$ of main generator 14. The net actual tractive effort of the traction motors NTE(ACT) is determined according to the product of the net actual power usage for the traction motors 24 NTHP(ACT) and the efficiency $E_{TM}$ of the traction motor and drive gears, divided by the locomotive speed and a conversion constant. The efficiency $E_{TM}$ is considered as a known and is stored as a function of the locomotive speed $N_L$. The net maximum tractive effort of the traction motors NTE(MAX) is determined as a function of the locomotive speed $N_L$ and the power controller setting PC.

Following the execution of instruction block 94, the decision block 96 is executed to determine if the net actual tractive effort NTE(ACT) is less than the net maximum tractive effort NTE(MAX). If so, the adhesion between the drive wheels 26 and the rail 34 is less than optimum, and the flow diagram branch designated generally by the reference numeral 98 is executed to take corrective action, if possible. If the net actual tractive effort is substantially equal to the maximum value, the adhesion is at an optimum, and the flow diagram branch 100 is executed to remove the corrective action, if any.

Referring first to the flow diagram branch 98, the blocks 102 and 104 establish an adhesion correction priority which initiates usage of the SLIMs prior to sanding. The decision block 102 determines if the SLIM voltage $V_{LM}$ is equal to the maximum, or fully energized SLIM voltage, $V_{LM}(MAX)$. If not, the SLIMs are not fully energized, and the blocks designated generally by the reference numeral 106 are executed to determine how much power should be directed to the SLIMs. If the SLIMs are fully energized (SLIM voltage $V_{LM}$ equal to $V_{LM}(MAX)$), the instruction block 104 is executed to initiate sanding of the tracks 34 to provide additional adhesion.

Referring to the blocks designated generally by the reference numeral 106, the instruction block 108 is executed to determine how much additional adhesion is needed and how much surplus engine power is available for boosting the adhesion with the SLIMs.

First, the net adhesive tractive effort due to increased adhesion with fully energized SLIMs, NATE(FULL), is computed according to the product of the actual adhesion level u and the attractive force AF(FULL) between the locomotive and the rails 34 with full energization of the SLIMs. The actual adhesion level u is defined at the point of slippage according to the expression:

$$u = NTE(ACT)/W$$

where W is the locomotive weight. The adhesion u therefore has a maximum value u(MAX) of:

$$u(MAX) = NTE(MAX)/W$$

The net additional electrical power requirement with full energization of the SLIMs, dNHP(FULL), is then computed according to the sum of the net additional power requirements of the traction motors 24, dNHP(TM), and the SLIMs, dNHP(SLIM). The term dNHP(TM) is computed according to the expression:

$$dNHP(TM) = [NATE(FULL) * N_L] / [K * E_{TM}]$$

where K is a conversion constant between locomotive speed and traction motor speed. The term dNHP(SLIM) is a known constant.

The reserve, or additional available electrical power output, HP(RES), is then computed according to the difference between the maximum electrical power output of the generator, EHP(MAX) * $E_G$, and the net actual power usage by the traction motors, NTHP(ACT).

A first power reduction term R1 is then computed according to the ratio of the reserve electrical power, HP(RES), to the electrical power requirement with full energization of the SLIMs, dNHP(FULL). The term R1 is limited to one or less as indicated. If the term R1 is equal to one, the engine 12 is capable of generating more than enough power for fully energizing the SLIMs. If the term R1 is less than one, the engine 12 is not capable of generating enough power for fully energizing the SLIMs.

The potential increase in tractive effort due to adhesion, NATE(POT), is given by the product of the term R1 and the term NATE(FULL). The term "potential" is used because the actual gain in tractive effort due to increased adhesion is limited by NATE(LMT), the difference between the maximum net tractive effort NTE(MAX) and the actual net tractive effort NTE(ACT). Once the adhesion has increased to the point where NTE(ACT) is equal to NTE(MAX), further increases in adhesion will not permit further increases in the tractive effort of the traction motors.

The decision blocks 110–114 serve to limit the SLIM excitation in situations where NATE(POT) exceeds NATE(LMT), and thereby avoid consumption of engine power to the extent that the increased attractive force fails to contribute to the tractive effort of the traction motors. The decision block 110 determines if NATE(POT) is greater than NATE(LMT). If so, the potential tractive effort increase NATE(POT) is not fully realizable. Unless the "MAXIMUM EFFORT" mode is active (as determined at decision block 112, the instruction block 114 is executed to compute a second power reduction term R2 according to the ratio of NATE(LMT) to NATE(POT). As with the term R1, the term R2 is limited to one or less.

If the "MAXIMUM EFFORT" mode is activated, the objective is to obtain the maximum possible tractive effort, and the instruction block 116 is executed to set the term R2 equal to one. If decision block 110 is answered in the negative, the potential adhesive tractive effort NATE(POT) is fully realizable, and the instruction block 117 is executed to set the term R2 equal to one.

The instruction blocks 118 and 92 are then executed to determine the value of the SLIM voltage term $V_{LM}$ and to energize the auxiliary generator field winding in accordance therewith. The term $V_{LM}$ is computed according to the expression:

$$V_{LM} = V_{LM}(MAX) * (R1*R2)^{\frac{1}{2}}$$

since the power requirement of the SLIMs varies according to the square of the applied voltage $V_{LM}$.

Alternatively, $V_{LM}$ may be determined by (1) computing NATE(LMT), (2) computing the attractive force AF(LMT) required to produce NATE(LMT), (3) determining the voltage $V_{LM}$(LMT) required to generate AF(LMT), and (4) reducing $V_{LM}$(LMT) by the power reduction term R1 to yield $V_{LM}$.

Referring now to the flow diagram branch 100, the blocks 122 and 124 determine the removal priority of the adhesion correction mechanisms. If the tracks are being sanded, as determined at decision block 122, the instruction block 124 is executed to stop the sanding and skip the remainder of the routine. If the tracks are not being sanded, the decision block 126 is executed to determine if the engineer has activated the "MAXIMUM EFFORT" mode. If so, the blocks designated generally by the reference numeral 106 are executed to energize the SLIMs as described above. In such event, the energization of the SLIMs will not result in an increase in the net tractive effort of the traction motors NTE(ACT), but will produce a linear propulsion force. If the "MAXIMUM EFFORT" mode is not activated, and the SLIM voltage term $V_{LM}$ is greater than zero (as determined at decision block 128), the instruction block 130 is executed to progressively reduce the SLIM energization. If the SLIMs were already deenergized ($V_{LM}=0$), the execution of instruction block 130 is skipped as indicated by the flow diagram line 132.

A typical example of locomotive operation with the energy management system of this invention as set forth in the flow diagram of FIG. 4 is now described.

The starting mode is somewhat unique, in that there is typically a relatively large surplus of unused engine power, regardless of the rail condition. If the rail condition is optimal, there is surplus power due to current limiting in the main generator; if the rail condition is less than optimal, there is more surplus power due to slippage of the wheels on the rails. This means that the net tractive effort during starting is relatively low, and that extra effort is desirable even if the energy conversion efficiency by which the extra effort is developed is relatively low. For this reason, the SLIMs are fully energized whenever the traction motor voltage $V_{TM}$ is indicative of a starting condition. Regardless of the rail condition, the SLIM energization will provide a linear propulsion force that boosts the overall starting effort. To the extent the rail condition is less than optimal, the SLIM energization will also increase the effective adhesion to permit increased tractive effort.

Once the locomotive is out of the start mode with optimal rail conditions, there will be little or no slippage, and the actual net tractive effort NTE(ACT) will substantially equal the maximum net tractive effort NTE(MAX) for the setting of the power controller. So long as the MAXIMUM EFFORT mode is inactive, the SLIMs remain deenergized since an increase in the attractive force between the locomotive and the rail will not permit increased tractive effort by the traction motors. If the MAXIMUM EFFORT mode is activated, the SLIMs are energized to provide a linear propulsion force, but only to the extent that surplus engine power is available for energizing the SLIMs.

If the rail conditions become less than optimum for any reason, and the actual adhesion falls below u(MAX), the locomotive will be unable to deliver the maximum net tractive effort NTE(MAX) because of slipping. Beyond a certain level of slippage, the locomotive wheel speed increase causes a reduction in the main generator current $I_{MG}$, and hence, the actual net tractive effort NTE(ACT). This is sensed by the energy management system of this invention, which counteracts the reduced adhesion by exciting the SLIMs. The slippage, if excessive, is also sensed by the locomotive slip control system, which acts to reduce the main generator output voltage $V_{MG}$. However, the voltage reduction is not as great as it would be without the energy management of this invention because of the increase in effective adhesion due to energization of the SLIMs.

The ability of the energy management system of this invention to increase the effective adhesion in the above situation may be limited by the size of the SLIMs, and the availability of unused engine power. The SLIMs are energized to the extent that the energization increases the tractive effort of the locomotive. The total additional power requirement of full energization is compared with the available engine power. The term R1, which is the ratio of the available power to the required power, is used to scale down the power level delivered to the SLIMs from the full power level.

The power delivered to the SLIMs is further reduced (term R2) to the extent the attractive force that would be generated thereby does not contribute to the tractive effort of the traction motors. This condition may occur in situations where the rail condition is only slightly less than optimal. Although the extra energization of the SLIMs would produce a linear propulsion force, the conversion of engine power to tractive effort via the traction motors is favored because it is typically more efficient. No such reduction is made, however, if the MAXIMUM EFFORT mode is active, since the objective of such mode is to obtain as much effort as possible.

If the energy management system of this invention also has control of sand dispersion, as in the flow diagram of FIG. 4, and the SLIMs are unable (for whatever reason) to increase the effective adhesion to the optimal level, sand is applied to the rails. Such sanding will continue so long as the actual net tractive effort NTE(ACT) is less than the maximum net tractive effort NTE(MAX).

If the SLIM energization, or the combination of the SLIM energization and sanding, fully counteracts the less than optimal rail conditions, the control unit will stop the sand, if any, and reduce the SLIM energization, in that order. If the tracks are being sanded, and turning off the sand causes a reduction in the tractive effort, sanding will be reinstituted. If the reduction in SLIM energization causes a reduction in the tractive effort, the energization level ($V_{LM}$) will be recomputed. A similar effect will be achieved if and when the rail conditions improve.

It will be remembered that in the broadest sense, this invention does not require that the energy management system control sand dispersion. As suggested in the above-referenced U.S. patent to de Buhr, the slip control system could control the sanding function to obtain a similar end result.

FIG. 5 depicts a flow diagram for an embodiment of this invention including sand dispersion, wherein sanding is the primary control response to suboptimal rail conditions, and SLIM energization is a supplemental control response for situations where sanding fails to fully counteract the rail condition. When the rail condition improves, the SLIM energization is removed first, then the sanding. Otherwise, the control method of energizing the SLIMs is the same as in FIG. 4.

With either control embodiment, it should be recognized that there is potential for destabilizing interaction between the locomotive slip control system and the energy management system of this invention. This is because the energy management system affects the wheel slippage, as measured by the slip control system. Essentially, interaction between the systems occurs whenever there is a change in the power setting or the rail condition. The overall response can be either stable or unstable, depending on the speed of response, or bandwidth, of the individual systems.

The potential for destabilizing interaction as described above can be avoided by suitably limiting the transient response of the slip control system or the energy management system using conventional control techniques. One of the systems would have a relatively fast acting response to changing rail or slip conditions, and the other system would have a relatively slow acting response. A similar effect may also be achieved by combining the two systems to form a single system capable of prioritizing the corrective response to detection of suboptimal rail conditions.

While this invention has been described in reference to the illustrated embodiment, various modifications will occur to those skilled in the art. By way of example, the auxiliary generator 60 could be replaced with an electronic AC-to-AC or DC-to-AC converter operated from the main generator 14 or bridge rectifier 16. In such case, the converter could provide a constant frequency output voltage independent of the engine speed, and the maximum SLIM voltage $V_{LM}(MAX)$ could be treated as a constant. Also, the SLIM geometry could be modified.

By way of further example, the energy management system of this invention could be applied to a locomotive deriving its power from an external source of electricity, such as a catenary power line. In such an application, the power source would be used to operate the motors of main and auxiliary motor/generator sets. The generator of the main motor/generator set would develop electrical power for exciting the traction motors, and the generator of the auxiliary motor/generator set would develop electrical power for exciting the SLIMs. The excitation voltage of the SLIMs would be scheduled as described herein to provide attractive force only to the extent that increased tractive effort is realized from the traction motors. Since the reserve power for energizing the SLIMs is limited only by the capacity of the auxiliary motor/generator set, the SLIM excitation voltage can be computed with a power reduction term R1 of one.

In any event, it should be recognized that systems incorporating these and other modifications may fall within the scope of this invention, which is defined by the appended claims.

The embodiments of the invention in which an exclusive property or privilege is claimed are defined as follows:

1. For a railway locomotive including a source of electrical energy, a primary traction mechanism for converting electrical energy to tractive effort including a locomotive wheel supported on a ferrous rail and an electrically powered traction motor connected to rotatably drive such wheel, and a supplemental energy conversion mechanism for increasing the effective adhesion between the locomotive wheel and the rail including at least one electrically activated single-sided linear induction motor (SLIM) suspended from the locomotive in close proximity to the rail, a method of operating the supplemental energy conversion mechanism comprising the steps of:

detecting the existence of a suboptimal operating condition for which the energy conversion capability of the primary conversion mechanism is limited due to less than optimal adhesion between the locomotive wheel the rail; and determining an actual adhesion level and maximum gain in energy conversion capability that could be obtained by the primary energy conversion mechanism with increased adhesion; and activating the SLIM in relation to such determined adhesion level and maximum gain for increasing the effective adhesion between the locomotive wheel and the rail when the existence of the suboptimal operating condition is detected, such that the SLIM is activated only to the extent that the consequent increase in effective adhesion increases the energy conversion capability of the primary energy conversion mechanism.

2. The method set forth in claim 1, including the step of:

reducing the activation of the SLIM at a progressive rate so long as suboptimal operating conditions are not detected.

3. The method set forth in claim 1, wherein the step of activating the SLIM includes the steps of:

determining the potential increase in tractive effort achievable by the primary energy conversion mechanism due to full activation of the SLIM, assuming that the increase in effective adhesion does not exceed an optimal adhesion level;

determining the limiting increase in tractive effort achievable by the primary energy conversion mechanism due to increased adhesion between the locomotive wheel and rail; and adjusting the activation of the SLIM in relation to the ratio of the limiting increase to the potential increase if the potential increase exceeds the limiting increase.

4. The method set forth in claim 3, including the steps of:

activating a maximum effort mode under conditions requiring maximum tractive effort regardless of the energy conversion efficiency; and setting the ratio of the limiting increase to the potential increase to one so long as the maximum effort mode is active, thereby increasing the activation of the SLIM to provide a linear propulsive force which increases the overall tractive effort of the locomotive.

5. The method set forth in claim 1 including the steps of:

monitoring locomotive operating conditions and activating a start mode for which the locomotive is attempting to accelerate from near-zero speed; and fully activating the SLIM while the start mode is active regardless of the adhesion between the locomotive wheel and rail, thereby to provide maximum tractive effort during starting.

6. The method set forth in claim 1, wherein the locomotive includes a selectively activatable mechanism for dispensing sand between the rail and the locomotive wheel to improve the adhesion therebetween, and the method includes the step of:

activating the sand dispensing mechanism when the existence of the suboptimal operating condition is detected only if the SLIM is already fully activated, and thereafter, deactivating the sand dispensing mechanism when the suboptimal operating condition is no longer detected, thereby to establish a control priority as between the sand dispensing mechanism and the supplemental energy conversion mechanism in which the sand dispensing mechanism is only activated when the SLIMs are incapable of completely alleviating the suboptimal operating condition.

7. The method set forth in claim 1, wherein the locomotive includes a selectively activatable mechanism for dispensing sand between the rail and the locomotive wheel to improve the adhesion therebetween, and the method includes the step of:

activating the sand dispensing mechanism at the onset of the suboptimal operating condition and inhibiting activation of the SLIM unless the suboptimal condition persists, and once the suboptimal operating condition has been alleviated, deactivating the sand dispensing mechanism only after the SLIM has been deactivated, thereby to establish a control priority as between the sand dispensing mechanism and the supplemental energy conversion mechanism in which the SLIM is only activated when the suboptimal operating condition is not alleviated by the dispensing of sand between the locomotive wheel and rail.

8. For a railway locomotive including a source of electrical energy, a primary traction mechanism for converting electrical energy to tractive effort including a locomotive wheel supported on a ferrous rail and an electrically powered traction motor connected to rotatably drive such wheel, and a supplemental energy conversion mechanism for increasing the effective adhesion between the locomotive wheel and the rail including at least one electrically activated single-sided linear induction motor (SLIM) suspended from the locomotive in close proximity to the rail, a method of operating the supplemental energy conversion mechanism comprising the steps of:

determining a maximum effort term representative of the tractive effort that should be developed by the traction motor when there is an optimal level of adhesion between the locomotive wheel and rail, such maximum effort indication being determined as a function of the speed of the locomotive and the setting of an operator manipulated power controller;

determining an actual effort term representative of the tractive effort actually developed by the traction motor;

activating the SLIM when the relative values of said maximum and actual effort terms indicate that the tractive energy conversion capability of the primary energy conversion mechanism is being limited by less than optimal adhesion between the locomotive wheel and rail, thereby to effectively increase the adhesion between the locomotive wheel and rail; and thereafter deactivating the SLIM when the relative values of said maximum and actual effort terms indicates that the primary energy conversion mechanism is no longer being limited by less than optimal adhesion.

9. The method set forth in claim 8, wherein the step of deactivating the SLIM comprises the step of:

reducing the activation of the SLIM at a progressive rate so long as the actual effort term is substantially equal to the maximum effort term.

10. The method set forth in claim 8, including the steps of:

activating a maximum effort mode under conditions requiring maximum tractive effort regardless of the energy conversion efficiency; and inhibiting deactivation of the SLIM so long as the maximum effort mode is active.

11. For a railway locomotive having an engine source of mechanical energy governed by an operator manipulated power control setting, a primary energy conversion mechanism including a locomotive wheel supported on a ferrous rail, an electric traction motor connected to rotatably drive such wheel, and a primary engine driven electrical generator for producing electrical energy to operate such traction motor, and a supplemental energy conversion mechanism including at least one electrically activated single-sided linear induction motor (SLIM) suspended from the locomotive in close proximity to the rail, and a supplemental engine driven electrical generator for producing electrical energy for activating such induction motor for increasing the effective adhesion between the locomotive wheel and rail, a method of operating the supplemental energy conversion mechanism comprising the steps of:

detecting the existence of an operating condition for which the energy conversion capability of the primary conversion mechanism is limited due to less than optimal adhesion between the locomotive wheel and the rail; and comparing a measure of the electrical power output of the primary generator with a maximum power reference corresponding to the maximum power output the engine is capable of developing at the power control setting, thereby to develop a signal indicative of the reserve power potential of the engine;

developing a power requirement signal in accordance with the combination of (1) the engine power required to fully energize the SLIM, and (2) the engine power required to increase the energization of the traction motor with the improved adhesion brought about by energization of the SLIM; and developing a control signal for the supplemental engine driven generator in accordance with a ratio of the reserve power potential signal to the power requirement signal, such that when the SLIM is energized in accordance with the control signal, the combined additional power requirements of the SLIM and traction motor do not exceed the reserve power potential of the engine.

12. The method set forth in claim 11, wherein the locomotive includes a selectively activatable mechanism for dispensing sand between the rail and the locomotive wheel to improve the adhesion therebetween, and the method includes the steps of:

activating the sand dispensing mechanism when the existence of the suboptimal operating condition is detected only if the SLIM is already fully activated, and thereafter, deactivating the sand dispensing mechanism when the suboptimal operating condition is no longer detected, thereby to establish a control priority as between the sand dispensing mechanism and the supplemental energy conversion mechanism in which the sand dispensing mechanism is only activated when the suboptimal operating condition is not alleviated by activation of the SLIM.

13. The method set forth in claim 11, wherein the locomotive includes a selectively activatable mechanism for dispensing sand between the rail and the locomotive wheel to improve the adhesion therebetween, and the method includes the steps of:

activating the sand dispensing mechanism at the onset of the suboptimal operating condition and inhibiting activation of the SLIM unless the suboptimal condition persists, and once the suboptimal operating condition is no longer detected, deactivating the sand dispensing mechanism only after the SLIM has been deactivated, thereby to establish a control priority as between the sand dispensing mechanism and the supplemental energy conversion mechanism in which the SLIM is only activated when the suboptimal operating condition is not alleviated by activation of the sand dispensing mechanism.

* * * * *